(12) United States Patent
Meirana et al.

(10) Patent No.: US 7,222,801 B2
(45) Date of Patent: May 29, 2007

(54) FLOOR BURIED SYSTEM FOR HEAT DISTRIBUTION

(75) Inventors: Alberto Meirana, Borghetto S. Spirito (IT); Pietro Giribone, Borghetto S. Spirito (IT)

(73) Assignee: M.K.M S.r.l., Savona (IT)

( * ) Notice: Subject to any disclaimer, the term of this patent is extended or adjusted under 35 U.S.C. 154(b) by 18 days.

(21) Appl. No.: 10/842,236

(22) Filed: May 10, 2004

(65) Prior Publication Data

US 2004/0256479 A1 Dec. 23, 2004

(30) Foreign Application Priority Data

May 12, 2003 (IT) .............................. RM03A0234

(51) Int. Cl.
*F24D 19/02* (2006.01)

(52) U.S. Cl. .............................. 237/69; 165/56; 165/49

(58) Field of Classification Search .................. 237/69, 237/43; 454/185; 165/56, 49, 171
See application file for complete search history.

(56) References Cited

U.S. PATENT DOCUMENTS

| | | | | |
|---|---|---|---|---|
| 3,929,186 A | * | 12/1975 | Becker | 165/49 |
| 4,011,989 A | * | 3/1977 | Diggs | 237/59 |
| 4,205,719 A | * | 6/1980 | Norell et al. | 165/76 |
| 4,285,332 A | * | 8/1981 | McHugh | 126/632 |
| 4,369,836 A | * | 1/1983 | Bleckmann | 165/171 |
| 4,501,128 A | * | 2/1985 | Gallagher | 62/238.6 |
| 4,779,673 A | * | 10/1988 | Chiles et al. | 165/45 |
| 4,865,120 A | * | 9/1989 | Shiroki | 165/56 |
| 4,880,051 A | * | 11/1989 | Ohashi | 165/45 |
| 5,022,459 A | * | 6/1991 | Chiles et al. | 165/11.1 |
| 5,263,538 A | * | 11/1993 | Amidieu et al. | 165/168 |
| 5,327,737 A | * | 7/1994 | Eggemar | 62/66 |
| 5,342,470 A | | 8/1994 | Meirana | |
| 5,433,087 A | * | 7/1995 | Locatelli | 62/520 |
| 5,454,428 A | * | 10/1995 | Pickard et al. | 165/49 |

(Continued)

FOREIGN PATENT DOCUMENTS

DE 30 20 910 12/1981

(Continued)

OTHER PUBLICATIONS

EPO Search Report.

*Primary Examiner*—Derek S. Boles
(74) *Attorney, Agent, or Firm*—Hedman & Costigan; James V. Costigan

(57) ABSTRACT

This invention concerns a floor buried system for heat distribution comprising heating means of a heating fluid, a pump, at least a rack (12) to which are coupled at least a supply pipe (13), at least a return pipe (18) and connection means characterised in that said at least a rack (12) comprises at least a supply collector pipe (14), at least a return collector pipe (17) and a plurality of supply pipes (1–11), said supply collector pipe (14) being connected to said supply pipe (13), through which the heating fluid flows by means of said pump, heated by said heating means, and in that said supply collector pipe (14) is connected to said plurality of supply pipes (1–11) which reach said at least return collector pipe (17), said at least a return collector pipe (17) being coupled to said at least a return pipe (18) from which outflows said heating fluid cooled.

16 Claims, 8 Drawing Sheets

U.S. PATENT DOCUMENTS

| | | | | |
|---|---|---|---|---|
| 5,542,603 | A | * | 8/1996 | Macduff ........................ 237/69 |
| 5,577,554 | A | * | 11/1996 | Umina .......................... 165/53 |
| 5,579,996 | A | * | 12/1996 | Fiedrich ....................... 237/69 |
| 5,788,152 | A | * | 8/1998 | Alsberg ........................ 237/69 |
| 5,964,402 | A | * | 10/1999 | Jakobson ..................... 237/69 |
| 6,126,081 | A | * | 10/2000 | Calvin et al. ........... 237/12.3 B |
| 6,220,523 | B1 | * | 4/2001 | Fiedrich ....................... 237/69 |
| 6,283,382 | B1 | * | 9/2001 | Fitzemeyer ................... 237/69 |
| 6,345,770 | B1 | * | 2/2002 | Simensen ..................... 237/69 |
| 6,467,174 | B1 | * | 10/2002 | Kotori .......................... 30/293 |
| 6,533,186 | B2 | * | 3/2003 | Neve et al. ................... 237/69 |

FOREIGN PATENT DOCUMENTS

| | | |
|---|---|---|
| DE | 38 00 880 | 7/1989 |
| DE | 39 32 972 | 4/1991 |
| JP | 60-030919 | 2/1985 |

* cited by examiner

FLOOR BURIED SYSTEM FOR HEAT DISTRIBUTION

This invention concerns a floor buried system for heat distribution. More in detail the invention concerns a system, designed and realised in particular for heat distribution directly from the floor. It is well known that heat tends to rise for the effect of the convection. Consequently, it is possible to obtain an optimisation of the distribution of the heat in the environment if said heat were radiating directly from the floor, especially if in a uniform way. The proposed solution according to the present invention allows obtaining a uniform distribution of the heat.

At the moment there are solutions, available in the market, which provide the radiating of the heat directly from the floor, which, however, have a lot of disadvantages about the radiating efficiency. Moreover, the pipe distribution has a typical shape as a coil. This kind of system has the disadvantage that the heat is not uniformly distributed. Moreover, there is a large waste at the beginning of the pipes, lower and lower, until the end of any heat exchange. Thus, in case of the system is installed in a place having wide dimensions, for example sheds, greenhouses, etc., there could be considerable temperature differences.

In view of the above, it is evident the necessity of a system such as the aforementioned, which presents high reliability characteristics, such as the one proposed by the present invention, which allows a greatest reduction of the repairs.

It is in this context that the solution, which is the object of the present invention, is introduced.

It is object of the present invention optimising the distribution of the heat in the surrounding environment, making the temperature of the floor as uniform as possible.

It is another object of the present invention introducing suitable enhancements to make the system as fault free as possible, caused in particular by connections and deviations.

It is specific subject matter of this invention a floor buried system for heat distribution comprising heating means of a heating fluid, a pump, at least a rack to which are coupled at least a supply pipe, at least a return pipe and connection means characterised in that said at least a rack comprises at least a supply collector pipe, at least a return collector pipe and a plurality of supply pipes, said supply collector pipe being connected to said supply pipe, through which the heating fluid flows by means of said pump, heated by said heating means, and in that said supply collector pipe is connected to said plurality of supply pipes which reach said at least return collector pipe, said at least a return collector pipe being coupled to said at least a return pipe from which outflows said heating fluid cooled.

Always according to the invention, the pipes of said plurality of supply pipes could be placed side by side such as the pipes of said plurality of return pipes.

Further according to the invention sad plurality of supply pipes and said plurality of return pipes could be spaced out from each other, creating a crossed flux of the heating fluid.

Still according to the invention, the pipes of said plurality of supply pipes could be placed perpendicularly (crossed) with respect to one and other.

Preferably according to the invention, said return pipe could bring back said heating fluid to said heating means.

Still according to the invention, said system could comprise a plurality of overlapping and/or adjoining racks.

Preferably according to the invention, said connecting means could comprise welding coupling means or junction-coupling means.

Further according to the invention, said connecting means could comprise mechanical connecting means such as clamp and/or threaded and/or compression connecting means.

Still according to the invention, said rack could be made by plastic material or by metal.

Further according to the invention, said heating fluid could be water. Always according to the invention, said heating means could comprise a boiler.

According to the invention, said pipes of said racks could provide wheelbase variations, according to the design necessities, among the pipes of said racks.

At last according to the invention, said system consisting of said racks could overlap an insulating layer (no conducting material) in particular in installations of said floor buried system even off the ground.

This invention will be now described, by way of explanation and not by way of limitation, according to its preferred embodiments, by particularly referring to the attached drawings, in which.

To understand better the present invention it is described in the following the functioning ways of the preferred embodiments of the system, being valid equivalent ways for other embodiments.

Figure 1:
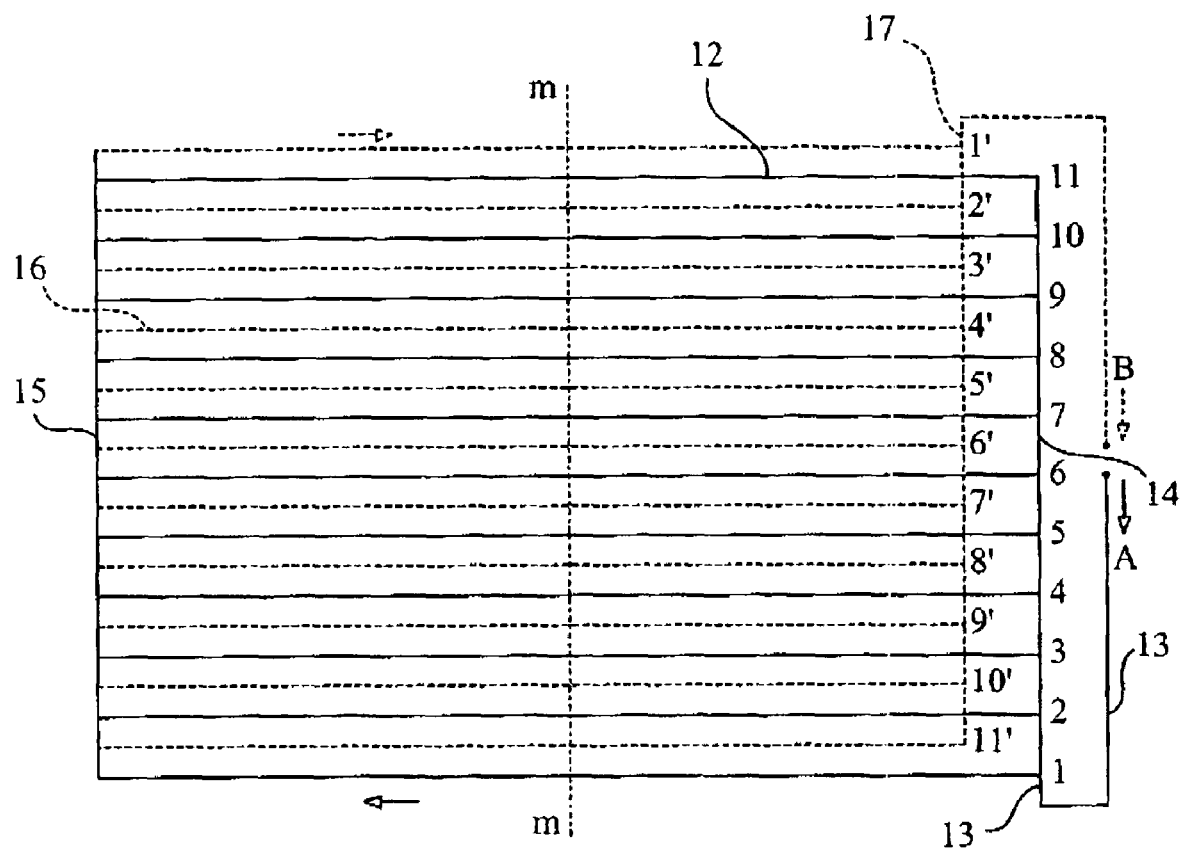
FIG. 1 shows a first embodiment of the floor buried system for heat distribution.

Referring to FIG. 1 it is shown a first embodiment of the floor buried system for heat distribution, which is placed under the floor of the environment to heat. In particular it is possible to see the rack 12 (drawn with an unbroken line) with the supply collector 14. From this pipe a set of pipes 1–11 branches out, which could have a variable number, according to the size of the environment to heat. The heating fluid going in the supply pipe 13 comes from a boiler and a pump, both of which are not shown in the figure.

Pipes 1–11 are connected to the collector pipe 15 from which it is branched out the rack 16 (drawn with a broken line) comprising of the return pipes 1'–11'. The pipes 1–11 and 1'–11' are placed in order that the supply pipes have an opposite flux respect to the return ones and be connected to each other in alternating mode, obtaining a cross flux. This allows a faster heat dispersion in any point of the floor, obtaining a distribution as uniform as possible of the same.

The return pipes 1'–11' of the rack 16, collect the cooled heating fluid in the return collector 17. At last, said fluid is collected in the return pipe 18 to be brought back again to the boiler and start again the cycle in the heating circuit.

The pipes of the rack are realised in plastic material. Moreover, the branches among the pipes 1–11 and 1'–11' respect to the supply collector 14 and to the return collector 17 or 15, are obtained by means of welding, without threaded connection or by means of compression. This guarantees a better watertight along the time.

The above mentioned welding technique is quoted in Italian Patent No. IT1231685. This method allows the welding between two pipes without adding external material, but only heating up to a fixed temperature the surfaces to be connected and carrying out a mechanic coupling.

The above described rack is placed under the floor, to be heated at a depth depending on the necessities of the system.

Considering the heat dissipation of a floor buried system, the heat emitted upwards from the rack depends on the used pipe, the thermal resistance and the thickness of the under layer, which is the layer between the floor and the heat source rack, on the distance among the pipes, the external pipe diameter, the temperature of the environment and of the layer below. Instead, the heat emitted by the rack downwards depends on the heat emitted upwards, on the temperature of the environment and of the layer below, which is not changed by the heat emitted by the rack and by the resistances of the under layer and of the layer below the rack. It is evident the complexity because of the large number of the variables involved in the analysis of the heat etchange.

Generally, in the current plant engineering the transmitted heat by the rack to the layer below is considered wasted, thus it is limited as much as possible increasing artificially the thermal resistance of the layer below. Valuing said resistance is not simple, indeed, the composition of the ground below could be made by many materials such as clays, sands, humidity.

In the system according to the present invention, as a result of the uniformity of the heat distributed by the rack caused in particular by the connection made by means of welding and of the staggered distribution of the hot pipes with respect to the cold ones, the downwards heat flux is not limited, thus obtaining a constancy of temperature that is very important to the hypogeum layers.

Indeed, the obtained effect due to the constancy of temperature is that the hot layer of the rack, uniformly distributed, exchanges heat with two ideal heat sources:

an upper source, which keeps constant and uniformly distributed the superficial temperature of the under layer, with respect to the irradiating panel;

a lower source, which temperature in the layers not affected by the convective exchange, results naturally in constants or not so variable temperatures.

Even if it is not very simple to value theoretically the heat exchange in the ground layer, the volumetric thermal mass (the product between the surface of the floor, the depth of the reacting ground and the density) provides results which are advantageous for the control of the microclimate of the environment.

Moreover, the isotherm hypogeum layers reflect the heat of the warm layer acting as a heat "tank" respect to rapid variations of the microclimate of the environment, maintaining in an efficient mode the controlled temperature.

The effects of the thermal steady state, due to, for example, breaks of the burner, are very useful. In those situations it can be seen the phenomenon of the reversing sources, that is the thermal tank below slows the surface cooling.

Figure 2:
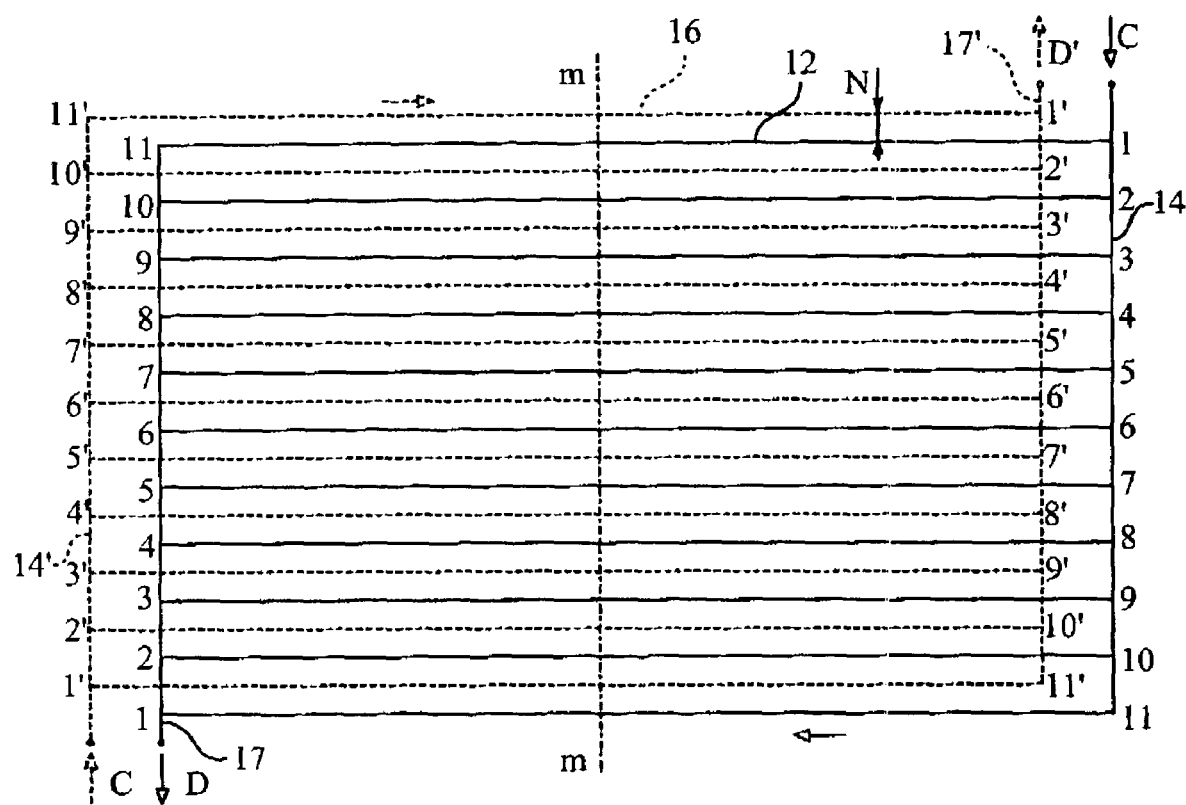
FIG. 2 shows a second embodiment of the floor buried system for heat distribution.

FIG. 2 shows another embodiment of the system of FIG. 1, in which there are two independent racks 12 and 16, which have the heat flux moving in an opposite direction respect to the supply and the return directions and in an alternate mode. The heating fluid goes in the supply pipes 13 and 13' following the directions C and C', arriving to the pipes 1–11 and 1'–11'. Then, this heating fluid, just cooled, comes to the return collectors 17 and 17' and goes out from the circuit, following the directions D and D'.

Figure 3:
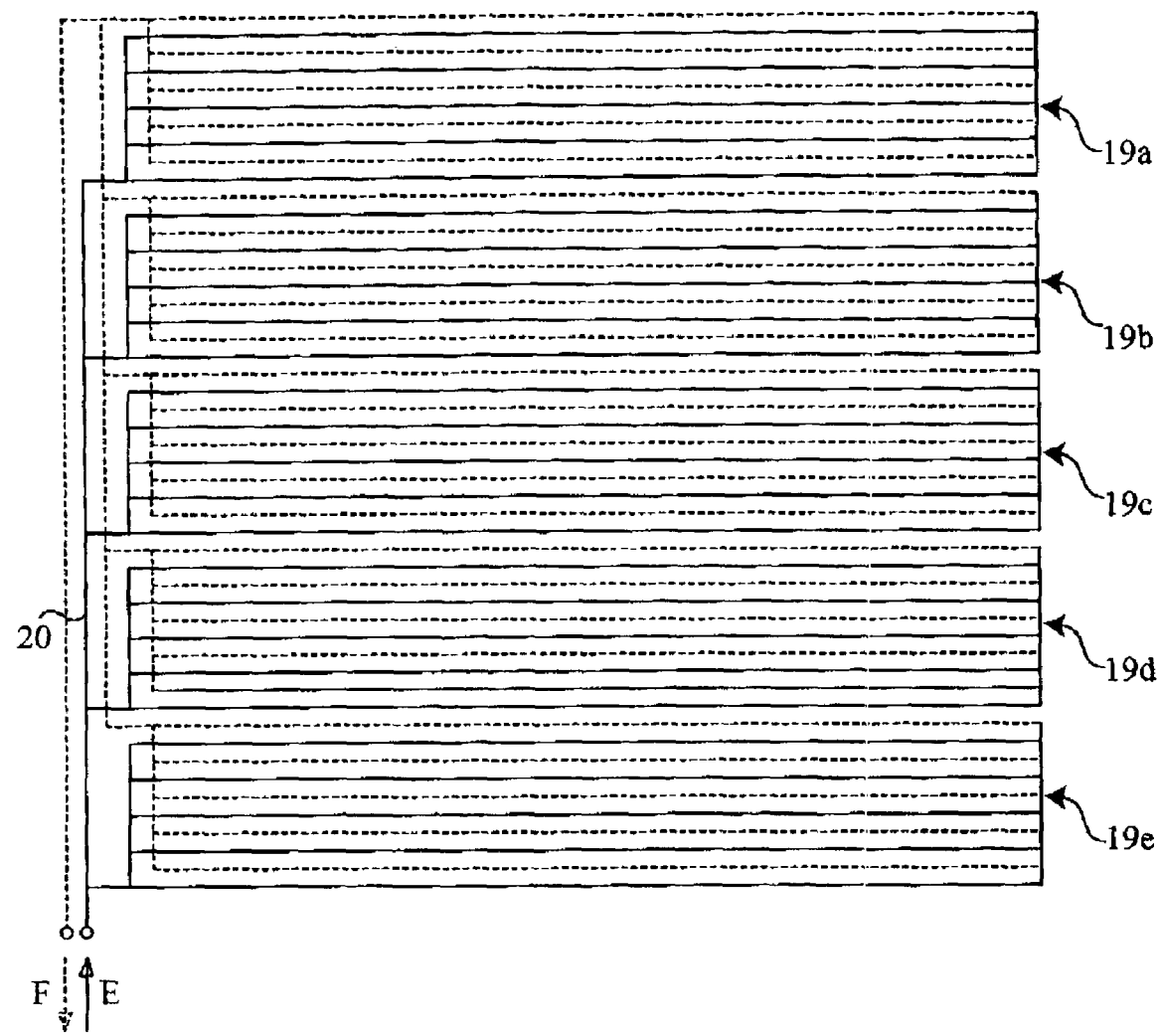
FIG. 3 shows a third embodiment of the floor buried system for heat distribution.

FIG. 3 shows a system having five racks 19a, 19b, 19c, 19d, 19e of the same type described in FIG. 1, which have a sole supply collector 20, in which the heating fluid goes in following the direction E, and a sole return collector 21, from which the heating fluid goes out following the direction F.

Figure 4:
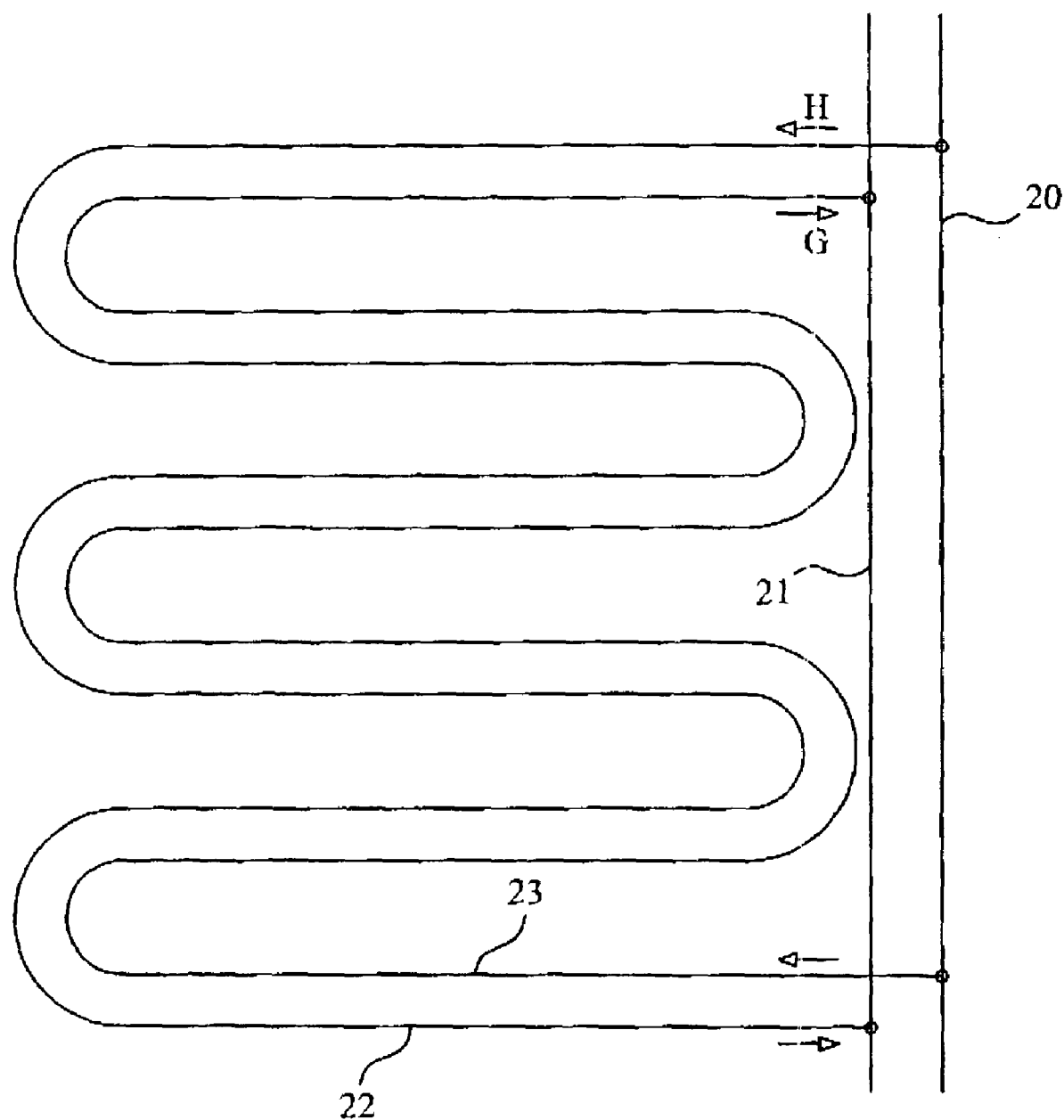
FIG. 4 shows a fourth embodiment of the floor buried system for heat distribution.

FIG. 4 shows a supply line 20 and a return line 21, which are connected respectively to two coils 22 and 23. It can be seen that the fluxes in the directions G and H are crossed.

FIGS. 5, 6, 7 and 8 shows topologies by which the racks can be distributed in places having wide dimensions, such as sheds, greenhouses, churches, etc. More in detail FIG. 6 points Out areas in which the racks have closer and fine pipes rather then in the other ones, to etchange different amounts of heat from an area to another.

Figure 5:
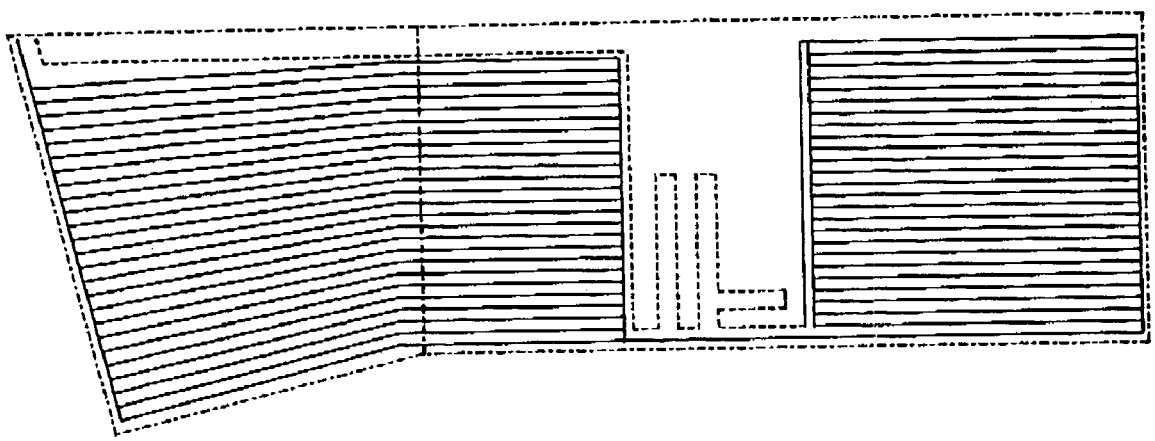
FIG. 5 shows a first topographic plan of a floor buried system for heat distribution.
Figure 6:
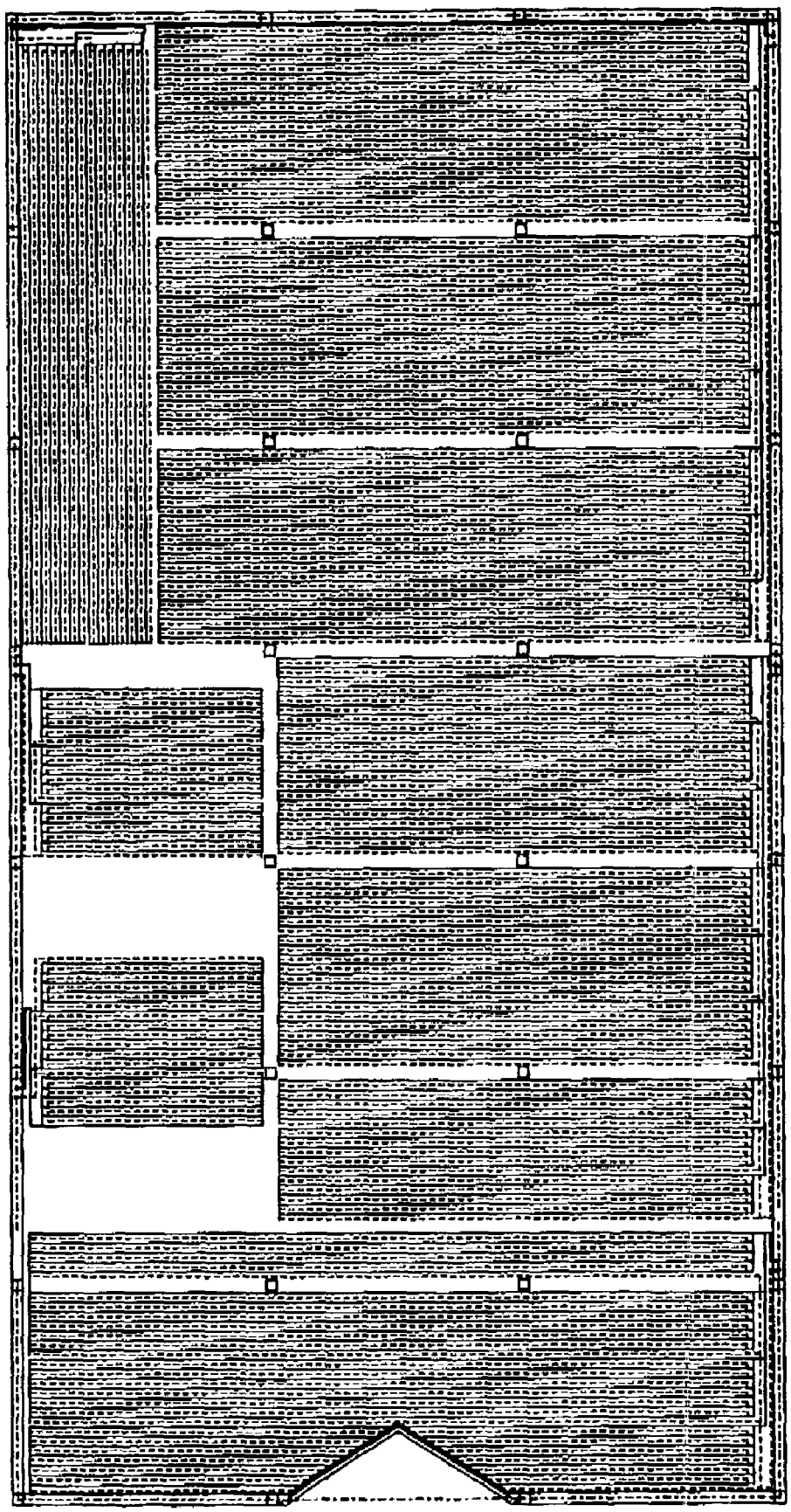
FIG. 6 shows a second topographic plan of a floor buried system for heat distribution.
Figure 7:
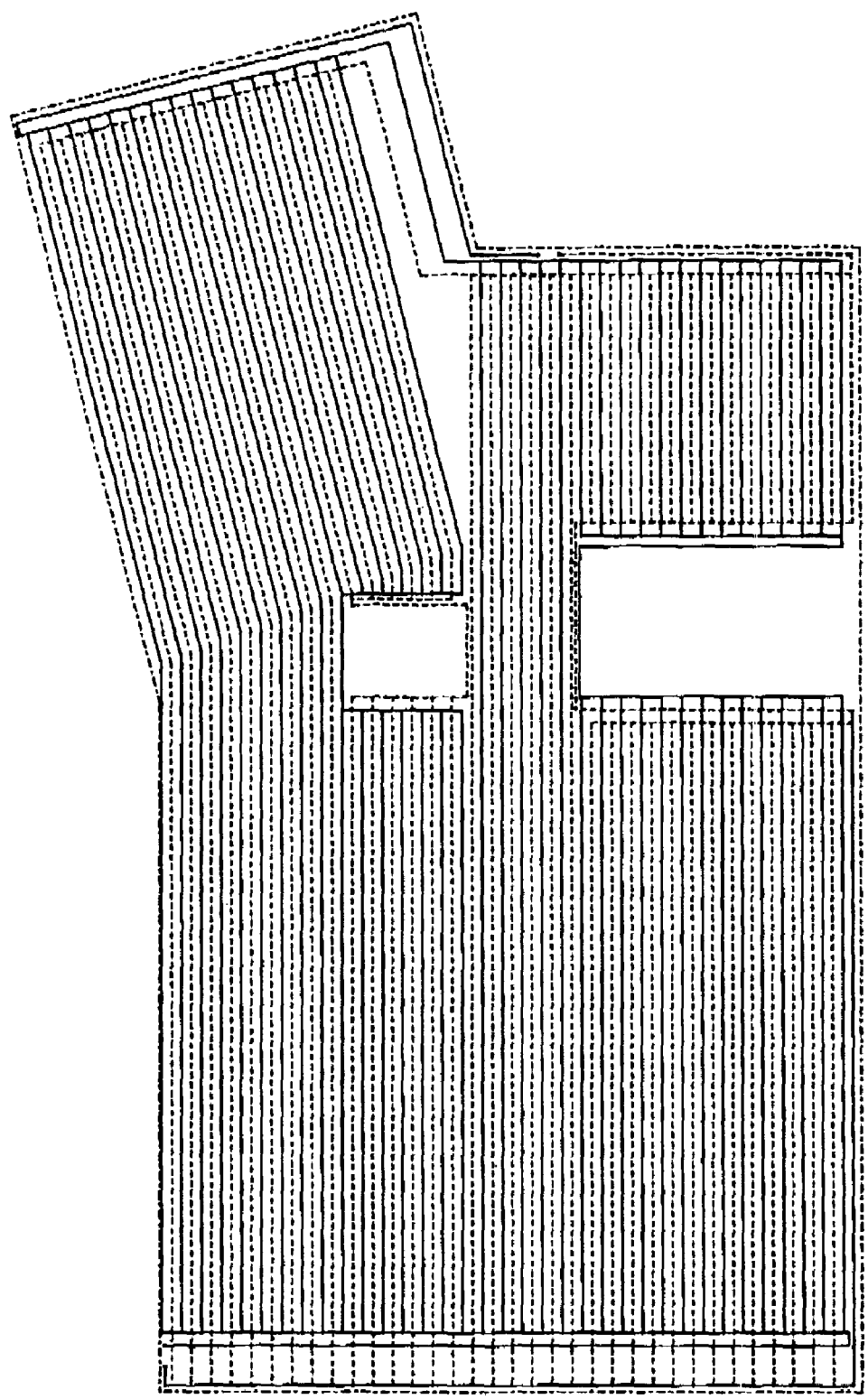
FIG. 7 shows a third topographic plan of a floor buried system for heat distribution.

Instead, FIGS. 5 and 7 shows distributions of racks, which have not heated areas, and angular ramifications in some points.

Figure 8:
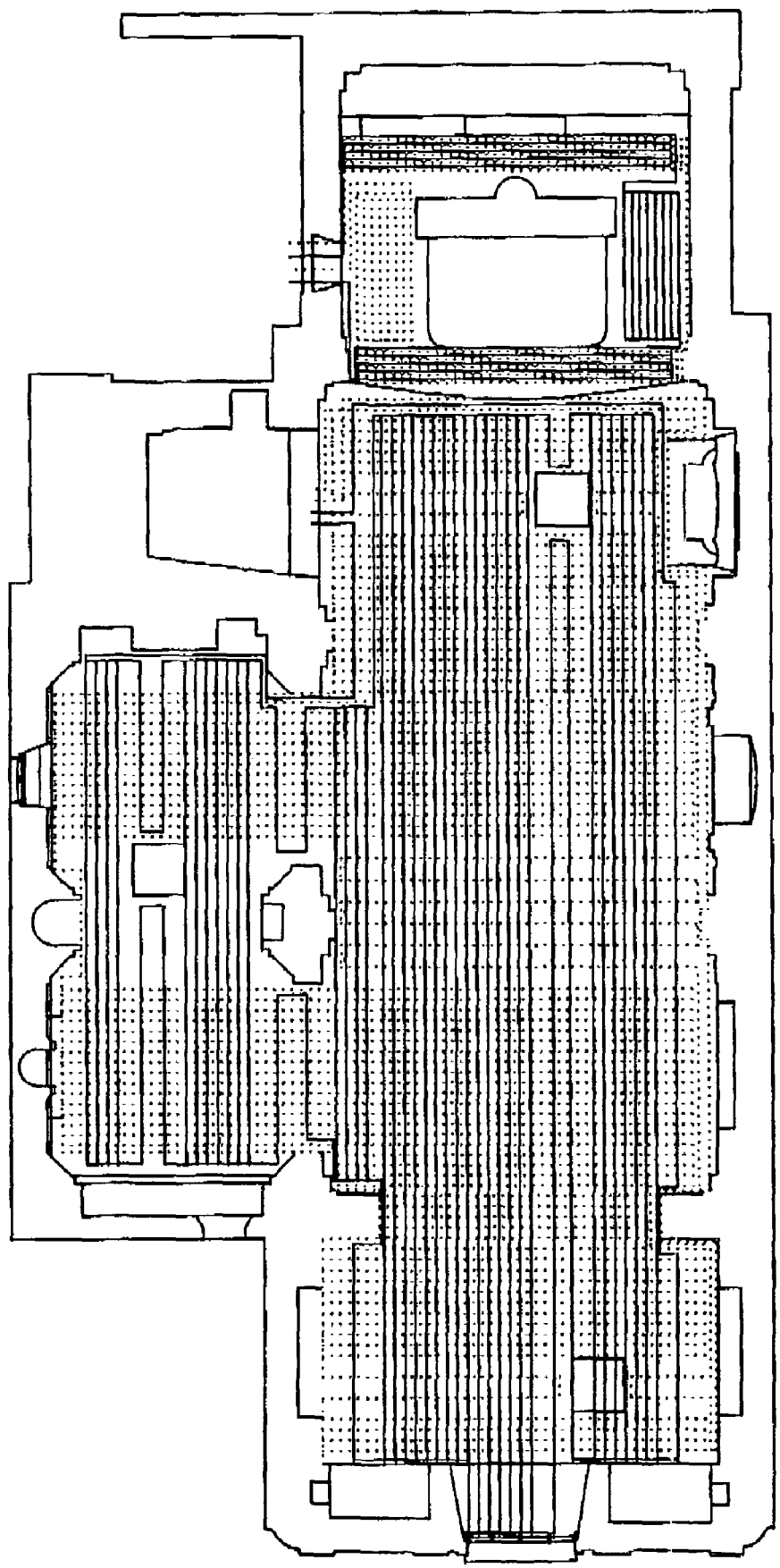
FIG. 8 shows a fourth topographic plan of a floor buried system for heat distribution.

At last, FIG. 8 shows the heating system in a church, where it is carried out a 90° crossing of the fluxes, due to the peculiarity of the perimeter and the overall dimensions.

An advantage of the present system respect to the well-known coil systems is the high flow rate of the heating fluid with a very low speed, obtaining a high efficiency by the thermal etchange among the pipes and the ground or the floor. This implies high reduction of the combustible, thus a reduction of the costs and of the air pollution respect to the traditional systems.

Moreover, the system according to the present invention provides a uniform distribution over the entire floor surface, With an optimal thermal etchange between the floor and the air of the place to be heat, without creating convective currents, which could be dangerous in places with very high ceiling such as churches, damaging works of art and frescos.

The system described in the present invention could be applied both in the industry, such as sheds, greenhouses, sports grounds, etc., and in civil houses, This invention have been above described by way of illustration, but not by way of limitation according to its preferred embodiments and it should be understood that those skilled in the art can make other modifications and changes without departing from the scope of the invention as defined in the following claims.

The invention claimed is:

1. A floor buried system for heat distribution comprising heating means of a heating fluid, a pump, at least a rack to which are coupled at least a supply pipe, at least a return pipe and connection means characterised in that said at least a rack comprises at least a supply collector pipe, at least a return collector pipe and a plurality of supply pipes, said supply collector pipe being connected to said supply pipe, through which the heating fluid flows by means of said pump, heated by said heating means, and in that said supply collector pipe is connected to said plurality of supply pipes, which reach said at least return collector pipe, said at least a return collector pipe being coupled to said at least a return pipe, from which outflows said heating fluid cooled said plurality of supply pipes and said plurality of return pipes being spaced apart from each other such that a crossflux of heat between said plurality of supply pipes and said plurality of return pipes occurs and a substantially isotherm hypogeum layer is formed to reflect heat from said supply pipes and maintain a controlled temperature of the environment of said floor.

2. A system according to claim 1, wherein at least a rack comprises a collector pipe to which is coupled said plurality of supply pipes and from which a branch of return pipes branches out.

3. A system according to claim 1, wherein the pipes of said plurality of supply pipes are placed side by side.

4. A system according to claim 1 wherein the plurality of supply pipes are placed perpendicularly with respect to one and other.

5. A system according to claim 1, wherein the pipes of said plurality of return pipes are placed side by side.

6. A system according to claim 1, wherein said return pipe brings back said heating fluid to said heating means.

7. A system according to claim 1, which comprises a plurality of overlapping and/or adjoining racks.

8. A system according to claim 1, wherein said connecting means comprise welding coupling means.

9. A system according to claim 1, wherein said connecting means comprise junction-coupling means.

10. A system according to claim 1, wherein said connecting means comprise mechanical connecting means.

11. A system according to claim 10, wherein said mechanical connecting means comprise clamp and/or threaded and/or compression connecting means.

12. A system according to claim 1, wherein said rack is made of plastic material.

13. A system according to claim 1, wherein said rack is made of metal.

14. A system according to claim 1, wherein said heating fluid is water.

15. A system according to claim 1, wherein said heating means comprise a boiler.

16. A floor buried system for heat distribution comprising heating means of a heating fluid, a pump, at least a rack to which are coupled at least a supply pipe, at least a return pipe and connection means characterised in that said at least a rack comprises at least a supply collector pipe, at least a return collector pipe and a plurality of supply pipes, said supply collector pipe being connected to said supply pipe, through which the heating fluid flows by means of said pump, heated by said heating means, and in that said supply collector pipe is connected to said plurality of supply pipes, which reach said at least return collector pipe, said at least a return collector pipe being coupled to said at least a return pipe, from which outflows said heating fluid each supply pipe and each return pipe being alternately spaced apart and side by side one another such that a crossflux of heat between said plurality of supply pipes and said plurality of return pipes occurs.

* * * * *